United States Patent
Seki et al.

(10) Patent No.: US 7,331,322 B2
(45) Date of Patent: Feb. 19, 2008

(54) INTAKE DUCT STRUCTURE

(75) Inventors: Yoshitaka Seki, Saitama (JP); Hiroshi Nakagome, Saitama (JP); Toshihisa Nagashii, Saitama (JP); Hitoshi Akaoka, Saitama (JP); Jun Hariu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/392,904

(22) Filed: Mar. 30, 2006

(65) Prior Publication Data

US 2006/0219201 A1 Oct. 5, 2006

(30) Foreign Application Priority Data

Mar. 31, 2005 (JP) ............................. 2005-102498

(51) Int. Cl.
*F02M 35/10* (2006.01)

(52) U.S. Cl. ............................................... 123/184.21

(58) Field of Classification Search .......... 123/184.21, 123/198 E, 184.53, 336; 180/68.3
See application file for complete search history.

(56) References Cited

U.S. PATENT DOCUMENTS

| | | | |
|---|---|---|---|
| 6,378,471 B1 * | 4/2002 | Yamada et al. | 123/65 PE |
| 6,422,201 B1 * | 7/2002 | Yamada et al. | 123/336 |
| 7,032,563 B2 * | 4/2006 | Nakagome et al. | 123/198 E |
| 7,111,701 B2 * | 9/2006 | Nagashii et al. | 180/219 |
| 2004/0050357 A1 * | 3/2004 | Idei et al. | 123/198 E |
| 2006/0027202 A1 * | 2/2006 | Yoshikawa et al. | 123/184.21 |

FOREIGN PATENT DOCUMENTS

JP 2004-301024 A 10/2004

* cited by examiner

*Primary Examiner*—Hai Huynh
(74) *Attorney, Agent, or Firm*—Birch, Stewart, Kolasch & Birch, LLP (57) ABSTRACT

An intake duct structure having an intake path extending forwardly from a cleaner box, penetrating through an area near a head pipe of a vehicle body frame, and opening at a front end portion of a front cowl. During low speed operation of the engine, an intake valve closes a main intake path MR from a front end intake port and opens a sub-intake path SR from a lower portion intake port. On the other hand, during high speed operation of the engine, the intake valve opens the main intake path MR and closes the sub-intake path SR. The lower portion intake port opens forward of a head pipe inside a front cowl and obliquely downwardly toward the rear. With this arrangement, entry of rainwater into the intake path can be minimized during low speed operation of the engine.

20 Claims, 7 Drawing Sheets

INTAKE DUCT STRUCTURE

CROSS-REFERENCE TO RELATED APPLICATION

The present application claims priority under 35 U.S.C. §119 to Japanese Patent Application No. 2005-102498, filed Mar. 31, 2005, the entire contents of which are hereby incorporated by reference.

BACKGROUND OF THE INVENTION

1. Field of the Invention

The present invention relates to an intake duct structure in a vehicle, such as a motorcycle or the like.

2. Description of Background Art

A conventionally known intake duct structure includes an intake duct extending forwardly from an air cleaner box, wherein the intake duct is made to open forward of the vehicle in an area downward of a head pipe of a vehicle body frame. Running wind is thereby introduced into the air cleaner box and a running wind pressure involved therewith is used as a boost pressure. The arrangement is known what is called as ram pressure boost (see, for example, Japanese Patent Laid-Open No. 2004-301024). This intake duct structure includes a valve for selecting either one of two intake paths. The valve is disposed in the intake duct and driven by a motor-driven actuator according to an engine speed.

Against the aforementioned conventional structure, an arrangement is known that includes an intake duct disposed so as to penetrate through an area near a head pipe of a vehicle body frame and made to open forwardly at a front end portion of a front cowl. While allowing the running wind to be more readily guided into the air cleaner box, this arrangement also lets rainwater and the like enter easily. Accordingly, it is desirable that a valve as described above be provided in the intake duct. It is also preferable that a driving mechanism for the valve be made simple, considering the arrangement, in which the valve is disposed forward of the head pipe.

SUMMARY AND OBJECTS OF THE INVENTION

It is therefore an object of the present invention to provide an intake duct structure disposed so as to penetrate through an area near a head pipe of a vehicle body frame and including an arrangement capable of selecting an intake path of the intake duct that is open at a front end portion of a front cowl.

According to a first aspect of the present invention, an intake duct structure includes an intake duct extending forwardly from an air cleaner box (for example, an air cleaner box 19 according to the embodiment of the present invention) to penetrate through an area near a head pipe (for example, a head pipe 6 according to the embodiment of the present invention) of a vehicle body frame (for example, and a vehicle body frame 5 according to the embodiment of the present invention) and opening at a front end portion of a front cowl (for example, a front cowl 46 according to the embodiment of the present invention). Also included are a main intake port (for example, a front end intake port 83 according to the embodiment of the present invention) opening toward a front of a vehicle at the front end portion of the front cowl, and a valve (for example, an intake valve 81 according to the embodiment of the present invention) selecting either a main intake path (for example, a main intake path MR according to the embodiment of the present invention) from the main intake port or a sub-intake path (for example, a sub-intake path SR according to the embodiment of the present invention) from a sub-intake port (for example, a lower portion intake port 86 according to the embodiment of the present invention), the valve closing the main intake path and opening the sub-intake path during a low speed operation of an engine, and the valve opening the main intake path and closing the sub-intake path during a high speed operation of the engine. The sub-intake port of the intake duct structure opens forward of the head pipe inside the front cowl and in a direction different from the main intake port.

With these arrangements, an outside air is drawn in through the sub-intake path from the sub-intake port that opens, inside the front cowl, in a direction different from the main intake port during the low speed operation of the engine. Entry of rainwater and the like into the intake path can be suppressed during the low speed running (or, ordinary running) having a low boost action by running wind pressure.

During the high speed operation of the engine, on the other hand, the outside air (running wind) is drawn in through the main intake path from the main intake port that opens toward the front of the vehicle at the front end portion of the front cowl. A boost effect by the running wind pressure can therefore be effectively achieved to improve engine output.

According to a second aspect of the present invention, the drive of the valve is accomplished by a diaphragm (for example, a diaphragm 91 according to the embodiment of the present invention) operated using an engine intake negative pressure. With this arrangement, the valve drive mechanism can be made simpler as compared with one using an actuator, contributing to a reduced weight and cost.

According to a third aspect of the present invention, the sub-intake port opens in a space covered by the front cowl on both sides thereof and in a lower surface of the main intake path such that an axis thereof (for example, an axis X according to the embodiment of the present invention) is inclined so as to be oriented rearwardly. With this arrangement, the sub-intake port opens being inclined so as to be oriented rearwardly inside the front cowl. Entry of rainwater and the like into the intake path during low speed running can be even further suppressed.

According to a fourth aspect of the present invention, the valve directly closes the sub-intake port disposed in a wall surface of the main intake path. With this arrangement, during the high speed running, or in a condition in which the sub-intake port is closed, the valve runs in parallel with the wall surface, not protruding in the main intake path. This minimizes intake resistance and enhances volumetric efficiency of the engine, thereby improving high speed output performance.

According to the first aspect of present invention, while entry of rainwater and the like into the intake path during low speed running can be suppressed, the engine output can be improved.

According to the second aspect of the present invention, the valve drive mechanism can be simplified to achieve reduction in weight and cost.

According to the third aspect of the present invention, the sub-intake port is oriented toward the rear, which even further suppresses entry of rainwater and the like into the intake path during low speed running.

According to the fourth aspect of the present invention, intake resistance can be minimized and volumetric efficiency of the engine can be enhanced for the improved high speed output performance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Throughout the descriptions given hereunder, expressions indicating directions including front and rear, and right and left, mean the same directions as those in a vehicle unless otherwise specified. In the drawings, an arrow FR indicates forward of the vehicle, an arrow LH indicates leftward of the vehicle, and an arrow UP indicates upward of the vehicle.

Figure 1:
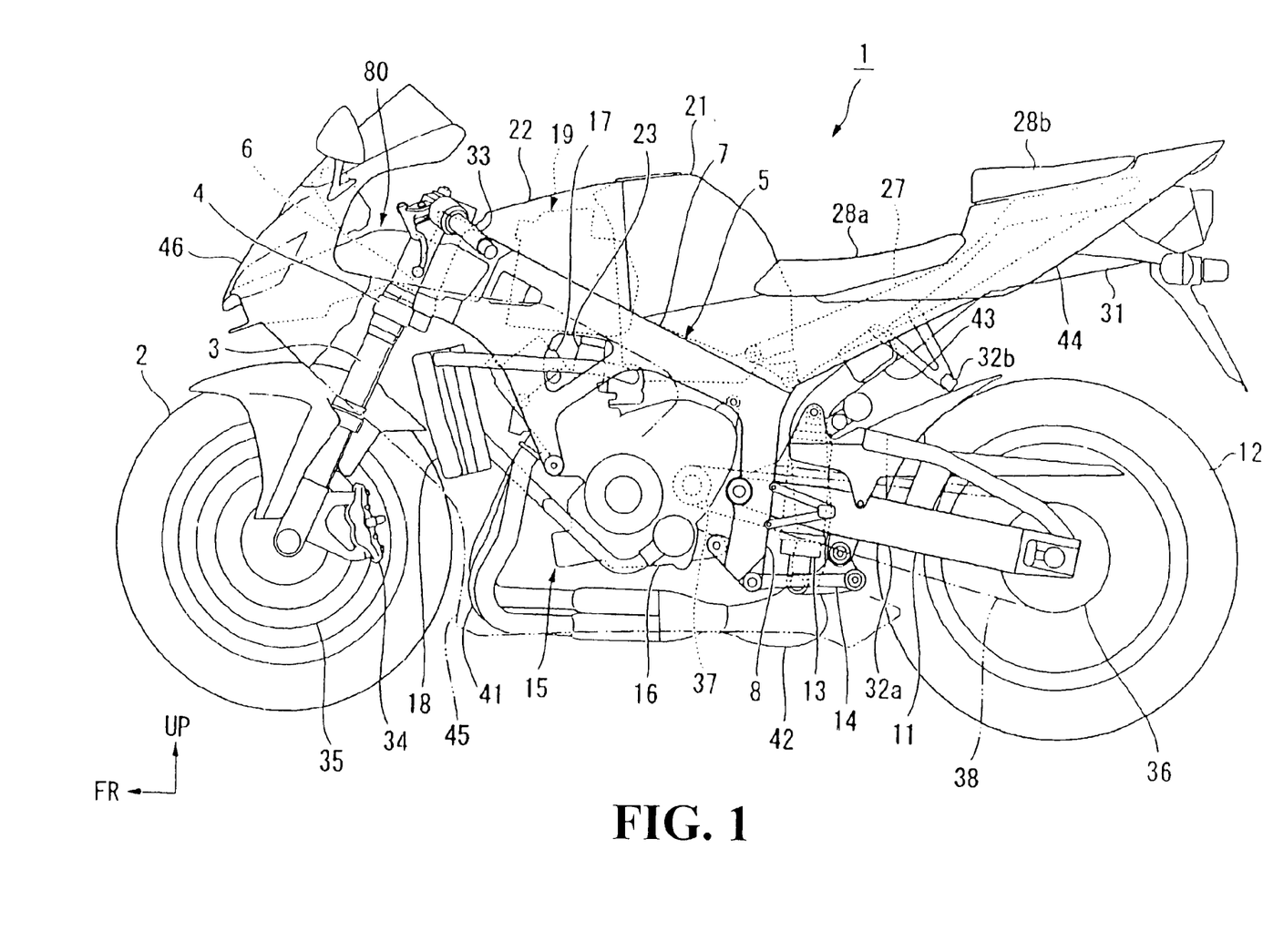
FIG. 1 is a side elevational view showing a motorcycle according to an embodiment of the present invention.

Referring to FIG. 1, a pair of right and left front forks 3 shaft supporting a front wheel 2 of a motorcycle 1 is pivoted steerably by a head pipe 6 of a vehicle body frame 5 via a steering stem 4. Right and left main frames 7 are extended obliquely downwardly and rearwardly from the head pipe 6. A rear end portion of each of the main frames 7 connects to a corresponding one of upper portions of right and left pivot plates 8.

While a front end portion of a swing arm 11 is pivoted swingably by each of the pivot plates 8, a rear wheel 12 is shaft supported on a rear end portion of the swing arm 11. A rear cushion 13 is disposed near a front end portion of the swing arm 11. One end portion of the rear cushion 13 is connected to the swing arm 11 and the other end portion of the rear cushion 13 is connected to a portion downward of a pivot of the pivot plate 8 via a linkage mechanism 14.

Disposed downward of the vehicle body frame 5 is a water-cooled, parallel four-cylinder engine 15 serving as a power plant for the motorcycle 1. The engine 15 includes a crankcase 16 and a cylinder portion 17. The cylinder portion 17 rises obliquely upwardly and forwardly on the crankcase 16 that constitutes a lower portion of the engine 15. A radiator 18 for cooling the engine 15 is disposed forward of the cylinder portion 17. An air cleaner box 19 is disposed upward of the cylinder portion 17. A fuel tank 21 is disposed rearward of the air cleaner box 19. An exterior cover 22, which is flush with the fuel tank 21, covers an upper portion of the air cleaner box 19.

Figure 2:
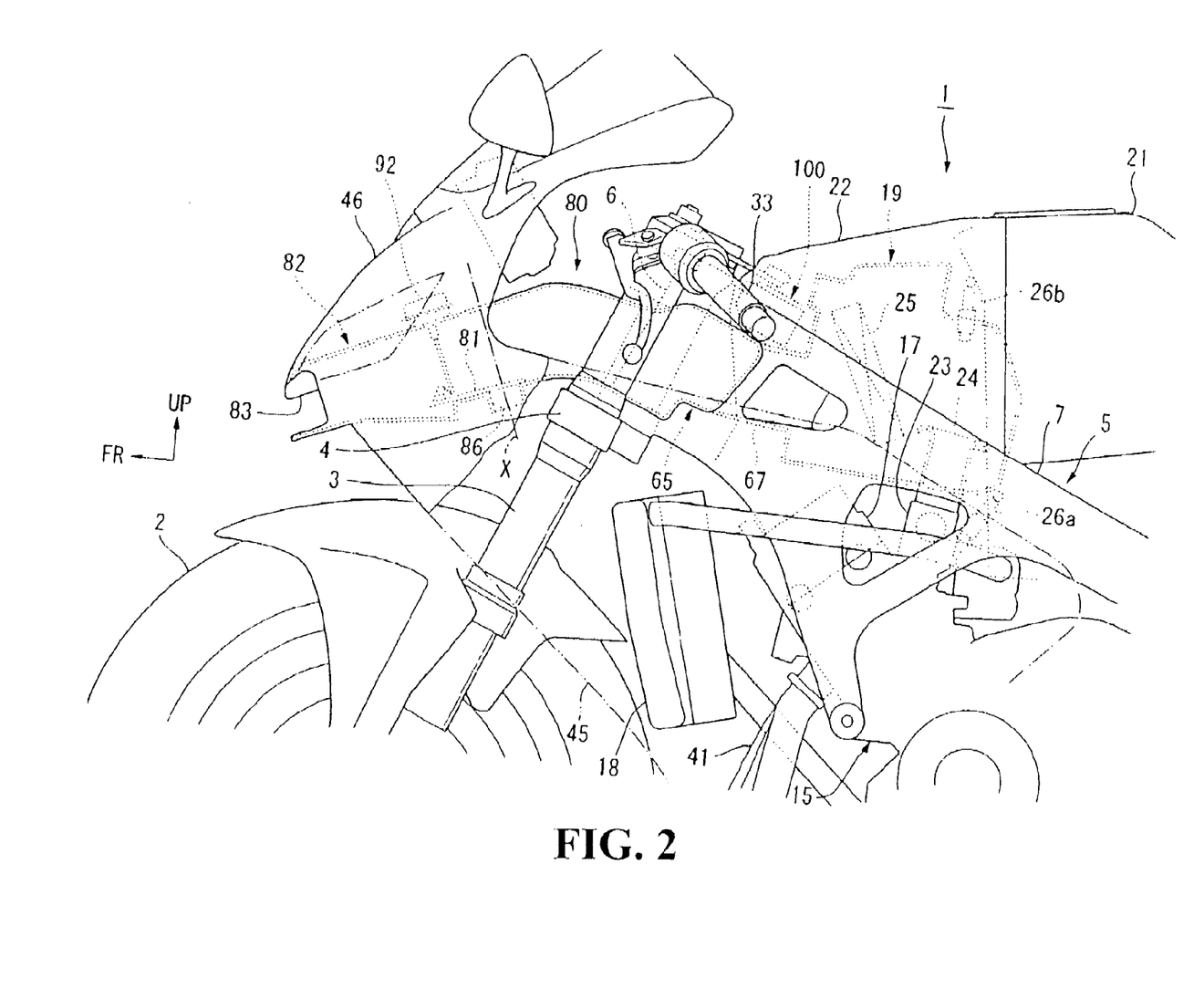
FIG. 2 is an enlarged view showing principal parts shown in FIG. 1.

Referring also to FIG. 2, upstream sides of four throttle bodies 23 arranged in a row corresponding to respective ones of the four cylinders are connected to a lower wall portion of the air cleaner box 19. A downstream side of each of the throttle bodies 23 is connected to an intake port in rear of the cylinder portion 17. Funnels 24 are disposed in array in the air cleaner box 19, each connecting to a corresponding one of the throttle bodies 23.

An intake duct 80 is connected to a front portion of the air cleaner box 19. The intake duct 80 penetrates through an area near the head pipe 6 of the vehicle body frame 5, opening at a front end portion of the front cowl 46. An outside air (running wind) can be guided into the air cleaner box 19 through the intake duct 80. This arrangement makes possible what is called ram pressure boost that uses a running wind pressure as a boost pressure during high-speed running. The intake duct 80 includes an intake valve 81 that variably selects an intake path in the intake duct 80.

The outside air guided into the air cleaner box 19 flows through, and is thus filtered by, an air cleaner element 25. The outside air is then guided into each of the funnels 24 and supplied into the engine 15 together with fuel injected by a first injector 26a disposed in each of the throttle bodies 23. A second injector 26b is disposed on an upper wall portion of the air cleaner box 19. The second injector 26b injects fuel toward each of the funnels 24 during, for example, high-speed rotation of the engine. The second injector 26b corresponds to each of the four cylinders.

A front end portion of a seat frame 27 inclined upwardly toward the rear is fastened to a rear side of an upper portion of each main frames 7. The seat frame 27 supports a seat 28a for a rider, a pillion seat 28b for a rear passenger, and a silencer 31. The seat 28a is disposed rearward of the fuel tank 21. The pillion seat 28b is disposed rearward of the seat 28a. The silencer 31 is disposed below the pillion seat 28b. A step 32a for the rider is mounted at a rear portion of each of the pivot plates 8. A step 32b for the rear passenger is mounted at a lower portion on both sides of the seat frame 27.

Right and left handlebars 33 for steering the front wheel are attached to upper end portions of the front forks 3. A brake caliper 34 is mounted on a lower end portion of each of the front forks 3. A brake disc 35 corresponding to each of the brake calipers 34 is mounted on either side of a hub portion of the front wheel 2. The brake calipers 34 and the brake discs 35 make up a front disc brake of the motorcycle 1. There is disposed a steering damper 100 rearward of the head pipe 6. The steering damper 100 gives a front wheel steering system a damping force.

A rear sprocket 36 is mounted on the left-hand side of a hub portion of the rear wheel 12. A drive chain 38 is wound around the rear sprocket 36 and a drive sprocket 37 disposed on the left-hand side of the rear portion of the engine 15. A power drive can thus be transmitted from the engine 15 to the rear wheel 12. A rear disc brake having the same construction as the front disc brake is disposed on the right-hand side of the rear wheel 12.

An exhaust pipe 41 corresponding to each of the cylinders is connected to an exhaust port at a front portion of the cylinder portion 17. The exhaust pipes 41 run along areas forward and downward of the engine 15 and converge into a single pipe. The converging pipe then rises upward on the right-hand side at the front of the swing arm 11, being routed to an area near the seat frame 27 and connected to the silencer 31. Reference numeral 42 represents an exhaust catalyst for purifying exhaust gases. Reference numeral 43 represents an exhaust device that varies a circulation area in the exhaust pipes 41.

A rear cowl 44 for covering an area around the seat frame 27 is attached at a rear portion of a vehicle body. A center cowl 45 for covering an area around the engine 15 is attached on both sides at a center of the vehicle body. Further, there is mounted at a front portion of the vehicle body a front cowl 46 for covering an area around the head pipe 6. An in-cowl duct 82 is disposed on an inside of the front cowl 46. The in-cowl duct 82 forms an intake path from a front end portion of the vehicle body frame 5 to a front end portion of the front cowl 46 in the intake duct 80.

Figure 3:
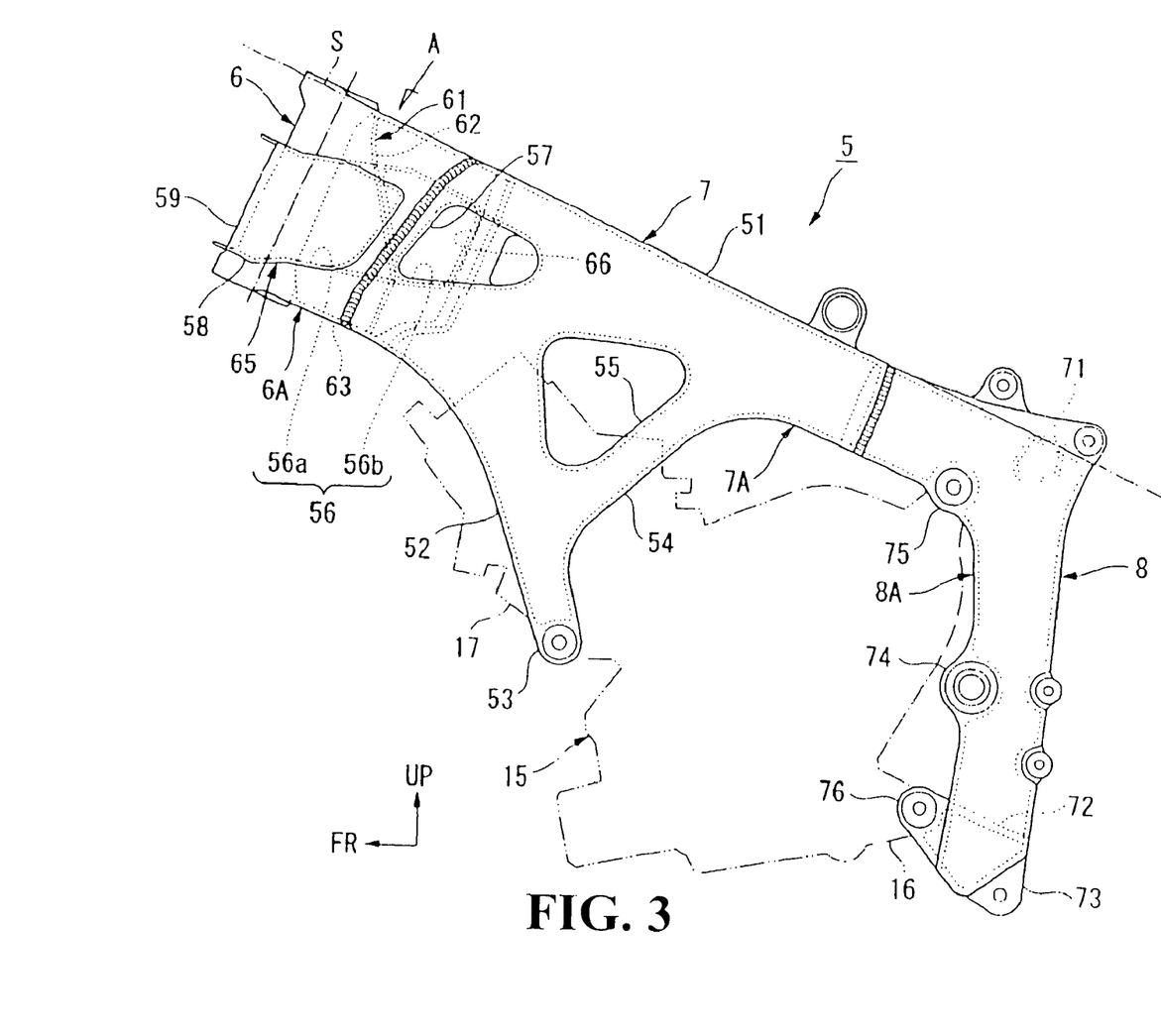
FIG. 3 is a side elevational view showing a vehicle body frame of the motorcycle according to the embodiment of the present invention.
Figure 4:
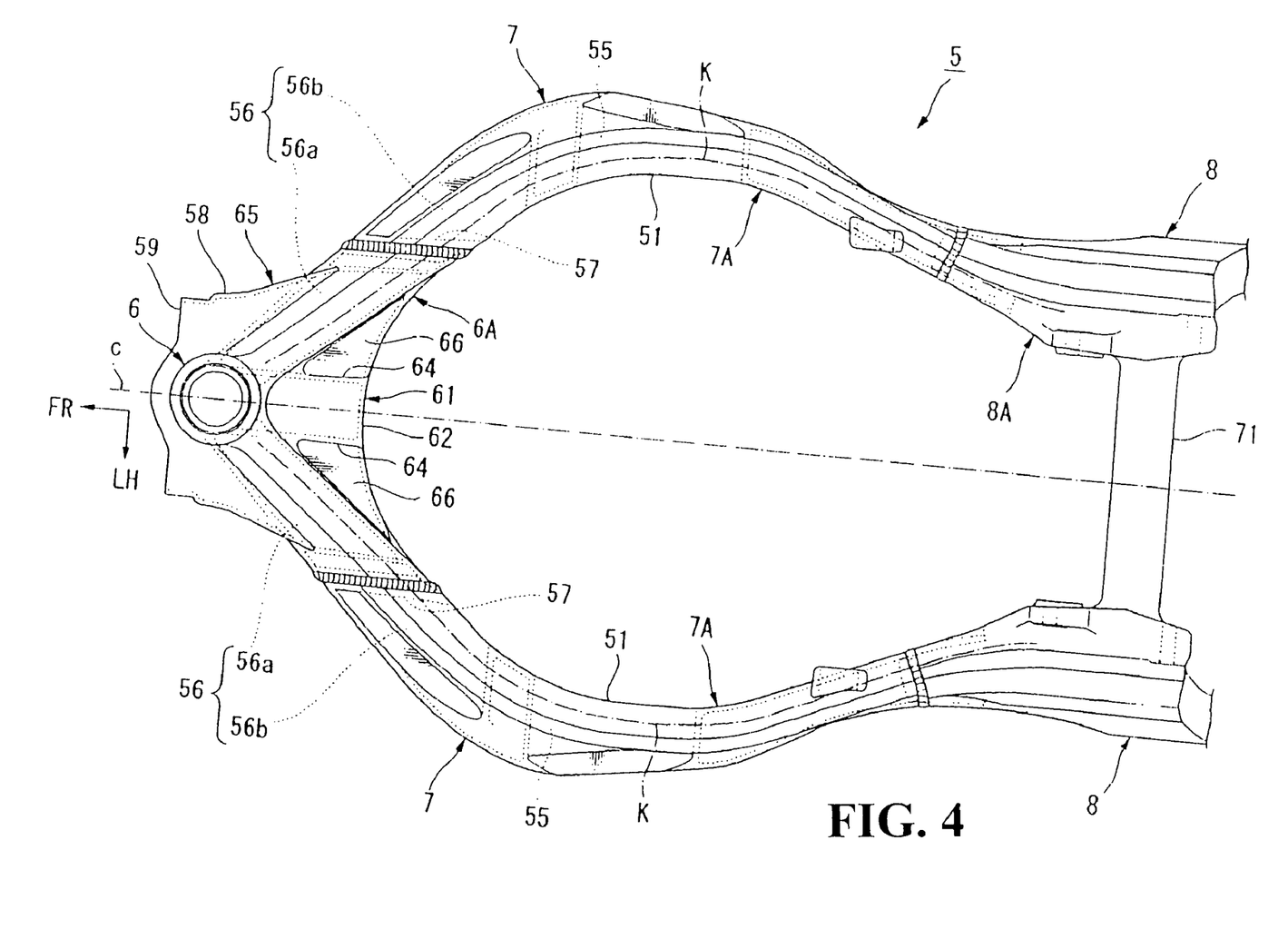
FIG. 4 is a view on arrow A of FIG. 3.

Referring to FIGS. 3 and 4, the vehicle body frame 5 is, in one aspect, what is called a twin tube frame, in which the head pipe 6 and the pivot plates 8 are linearly connected with the main frames 7. The vehicle body frame 5 is, in another aspect, so-called a diamond frame structure that uses the engine 15, which the vehicle body frame 5 itself suspends, as a strength member. The vehicle body frame 5, thus structured, is a plurality of castings made of an aluminum alloy integrally welded together. The seat frame 27 includes right-hand and left-hand halves of castings made of an aluminum alloy. A front end portion of each of the right-hand and left-hand halves is fastened integrally to the rear end portion of the vehicle body frame 5, while a rear end portion thereof is mutually integrally fastened together.

The head pipe 6 is a cylindrical member inclined such that an upper portion thereof is disposed rearwardly. Each of the main frames 7 extends rearwardly so as to follow along an inclined plane S that is inclined downwardly toward the rear and substantially orthogonal to an axis of the head pipe 6. An upper end of the head pipe 6 and upper surfaces of the main frames 7 are disposed substantially on the inclined plane S.

Each of the main frames 7 extends, in plan view (view on arrow A of FIG. 3) that is orthogonal to the inclined plane S, so as to branch rearwardly and obliquely outwardly in a vehicle width direction from the head pipe 6. Each of the main frames 7 then curves mildly in a middle portion in a longitudinal direction thereof and extends rearwardly and inwardly in the vehicle width direction. Each of the main frames 7 finally continues smoothly into a corresponding one of the right and left pivot plates 8 disposed substantially in parallel with each other. In FIG. 3 and others, reference numeral C represents a centerline in the vehicle width direction (centerline in a crosswise direction). Reference numeral K represents a curve that curves along each of the main frames 7 on the inclined plane S (specifically, a curve that follows along an extending direction of each of the main frames 7).

Assume that a direction orthogonal to the inclined plane S is a vertical direction of the main frames 7 (generally corresponding to a vertical direction). Also assume that a direction running in parallel with the inclined plane S and orthogonally relative to the curve K is a horizontal direction of the main frames 7 (corresponding to an inboard and outboard direction of the vehicle). Then, each of the main frames 7 is a hollow structure that is, in cross section, a rectangle having a longer length in the vertical direction than in the horizontal direction. In addition, the hollow structure has an outer peripheral portion formed with a predetermined wall thickness.

Assume that a portion of each of the main frames 7 extending linearly in side view from the head pipe 6 to the pivot plate 8 is a frame main body 51. The frame main body 51 is formed such that, whereas a front half portion thereof has a vertical length substantially equal to that of the head pipe 6, a rear half portion thereof has a shorter vertical length. A tapered engine hanger 52 is extended downwardly from the front half portion of the frame main body 51. The engine hanger 52 has a front side suspension portion 53 at a leading end thereof. The engine 15 is supported when the front side suspension portion 53 is connected to a front side base portion of the cylinder portion 17 of the engine 15.

A reinforcement member 54 is disposed across a rear portion of the engine hanger 52 and a lower side of the rear half portion of the main frame 7. The reinforcement member 54 is inclined upwardly toward the rear. The main frame 7 includes, at a middle portion thereof in the longitudinal direction, a center opening portion 55 penetrating therethrough in the vehicle width direction. The reinforcement member 54, the engine hanger 52, and the frame main body 51 are arranged to surround the center opening portion 55.

The main frame 7 (frame main body 51) includes, at a front portion thereof, a front side opening portion 56 penetrating therethrough in the vehicle width direction at a middle portion in the vertical direction. The main frame 7 is thereby branched toward the front.

At each of the center opening portion 55 and the front side opening portion 56, inner and outer walls of the hollow main frame 7 are cut out, while an inner peripheral wall extending across the inner and outer walls is formed so as to function also as a cross member for connecting the inner and outer walls. A stiffness balance of an entire vehicle body frame 5 is optimized by the main frames 7 having the center opening portions 55 and the front side opening portions 56 formed therein as described above.

The front side opening portion 56 is a triangle having a shallow vertical length and tapering toward the rear in side view. The front side opening portion 56 includes, at a middle portion in the fore-aft direction, a rib portion 57 that traverses the front side opening portion 56 along a plane substantially orthogonal to the crosswise direction. The rib portion 57 partitions the front side opening portion 56 into a head side opening portion 56a and a frame side opening portion 56b.

A duct cover 58 is integrally formed with an outer side at the front end of the vehicle body frame 5. The duct cover 58 extends to cover front portions of both main frames 7 as well as the head pipe 6. The duct cover 58 includes an intake port 59 formed to open forwardly at a position immediately before the head pipe 6. The duct cover 58 also keeps the intake port 59 in communication with each of the head side opening portions 56a. A rear end portion (an intake outlet) of the in-cowl duct 82 is connected to the intake port 59 of the duct cover 58.

A gusset 61 is integrated with an inside at the front end portion of the vehicle body frame 5. The gusset 61 extends to cover the head pipe 6 and the front portions of the main frames 7. The gusset 61 includes a curved wall portion 62 and a lower wall portion 63. The curved wall portion 62 is curved so as to protrude forwardly in top view. The lower wall portion 63 extends forwardly from a lower edge of the curved wall portion 62. The curved wall portion 62 extends downwardly from a rear end portion of an upper portion of the head pipe 6 and an upper edge portion at a front portion of the main frame 7 and obliquely so as to be gradually away relative to the head pipe 6. The curved wall portion 62 then continues into the flat lower wall portion 63 that overlaps in side view with a lower edge portion of the main frame 7. Through the foregoing arrangements, the gusset 61 reinforces the front end portion of the vehicle body frame 5. Meanwhile, the gusset 61 helps widen a space between upper ends at the front portion of the main frames 7 rearward of the head pipe 6 so that the steering damper 100 and the like can be easily disposed therein (see FIG. 2).

The gusset 61 has an inside defined by a pair of barrier ribs 64 extending rearwardly from edge portions on both sides of the head pipe 6. Accordingly, there is formed at the front end portion of the vehicle body frame 5 an in-frame duct 65 that branches into both sides of the head pipe 6 from the intake port 59 at the front end of the duct cover 58 and extends rearwardly. The in-frame duct 65 has right and left intake outlets 66 that open at the curved wall portion 62 of the gusset 61. A front end portion (intake port) of a box-side duct 67 extending from a front wall portion of the air cleaner box 19 is connected to each of these intake outlets 66 (see FIG. 2).

The in-cowl duct 82, the in-frame duct 65, and the box-side duct 67 constitute the intake duct 80, and thus form the intake path that penetrates through the front end portion of the vehicle body frame 5 from the front end portion of the front cowl 46 to the air cleaner box 19, extending substantially linearly (see FIG. 2).

Each of the pivot plates 8 extends downwardly so as to bend at a rear end portion of each of the main frames 7. An upper cross member 71 and a lower cross member 72, each running along the vehicle width direction, are placed across upper portions and lower portions, respectively, of the pivot plates 8. A connection portion 73 with the linkage mechanism 14 is disposed at a center portion of the lower cross member 72 in the vehicle width direction. The upper cross member 71 functions for adjusting stiffness of the vehicle body frame 5. The upper cross member 71 is smaller in size and has a thinner wall than the lower cross member 72.

A shaft support portion 74 for supporting a pivot of the swing arm 11 is disposed substantially at a center portion in the vertical direction of each of the pivot plates 8. Each of the pivot plates 8 includes a rear portion upper side suspension portion 75 and a rear portion lower side suspension portion 76 disposed on the upper portion and the lower portion thereof, respectively. The rear portion upper side suspension portion 75 connects to and supports a rear portion upper side of the crankcase 16 of the engine 15. The rear portion lower side suspension portion 76 connects to and supports a rear portion lower side of the crankcase 16 of the engine 15. The rear half portion of the vehicle body frame 5 is appropriately reinforced when corresponding parts of the engine 15 are connected to the rear portion upper side suspension portion 75, the rear portion lower side suspension portion 76, and the front side suspension portion 53.

The vehicle body frame 5 is formed by integrally welding together the four aluminum castings. Specifically, the vehicle body frame 5 can be divided into a head pipe portion 6A, right and left main frame portions 7A, and a pivot plate portion 8A. The head pipe portion 6A integrates the head pipe 6 with each of the front portions of the main frames 7. Each of the right and left main frame portions 7A mainly includes the middle portion of each of the main frames 7. The pivot plate portion 8A integrates the rear portions of the main frames 7 and the pivot plates 8 via the upper cross member 71 and the lower cross member 72.

Figure 5:
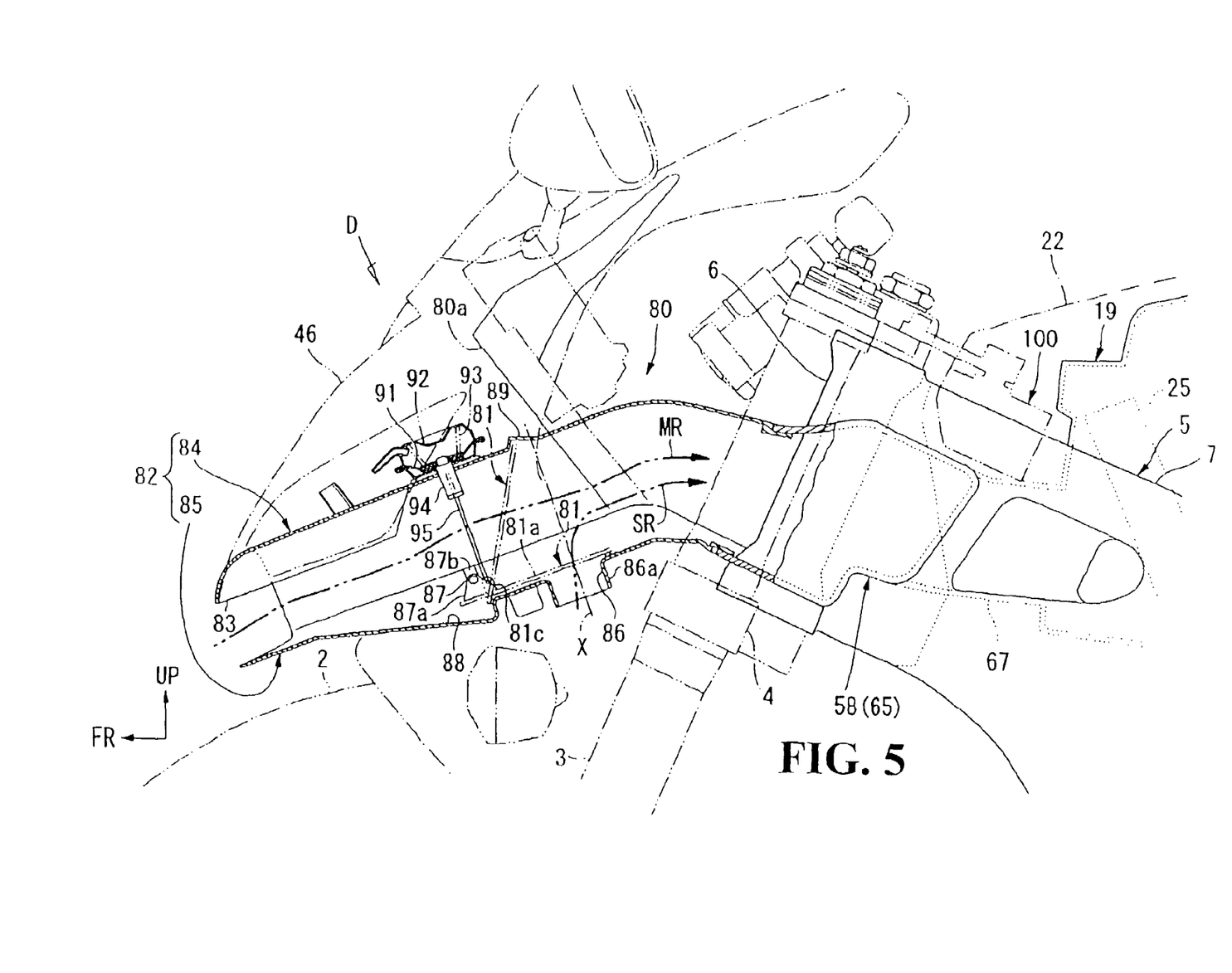
FIG. 5 is a side elevational view showing an area around an intake duct of the motorcycle according to the embodiment of the present invention.

Referring to FIG. 5, the front end portion of the front cowl 46 is disposed forward of a lower end portion of the head pipe 6. The in-cowl duct 82 extends upwardly toward the rear from a front end intake port (main intake port) 83 that is open toward the front of the vehicle at the front end portion of the front cowl 46. The in-cowl duct 82 then, at a rear portion thereof, bends downwardly toward the rear and connects to the duct cover 58 (in-frame duct 65) of the vehicle body frame 5. A rear end portion of thus arranged in-cowl duct 82 is joined integrally with the duct cover 58 using, for example, a bolt passed through from both sides, or the like.

Figure 6:
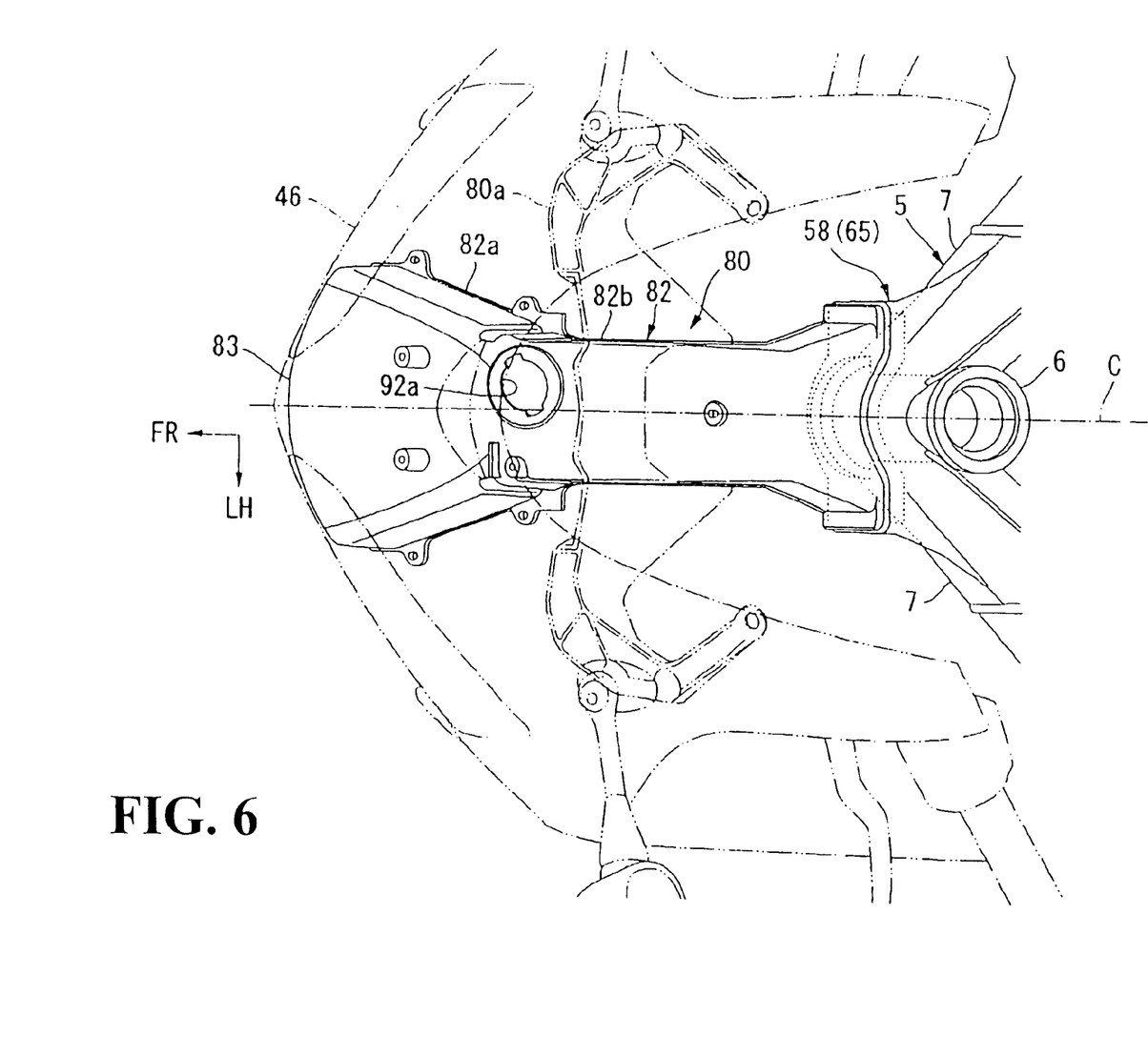
FIG. 6 is a plan view showing an area around the intake duct.

Referring also to FIG. 6, the in-cowl duct 82 extends along the fore-aft direction at the center portion in the vehicle width direction. The in-cowl duct 82 includes a portion that is tapered in plan view, narrowing the intake path from the front end intake port 83 thereof toward the rear (hereinafter referred to as a front side tapered portion 82a). The in-cowl duct 82 further includes a portion extending straightly after the front side tapered portion 82a so as to have a substantially constant cross section (hereinafter referred to as a straight portion 82b). The in-cowl duct 82 further includes a portion, in rear of the straight portion 82b, which bends downwardly toward the rear and is tapered in plan view to widen the intake path. The in-cowl duct 82 is then connected to the duct cover 58.

The in-cowl duct 82 has a rectangular hollow cross section, including a duct upper 84 and a duct lower 85. The duct lower 85 mainly includes a lower wall portion of the in-cowl duct 82. The duct upper 84 mainly includes an upper wall portion and both side wall portions of the in-cowl duct 82. A support stay 80a is mounted integrally with the in-cowl duct 82 for supporting the front cowl 46 and the like.

Figure 7:
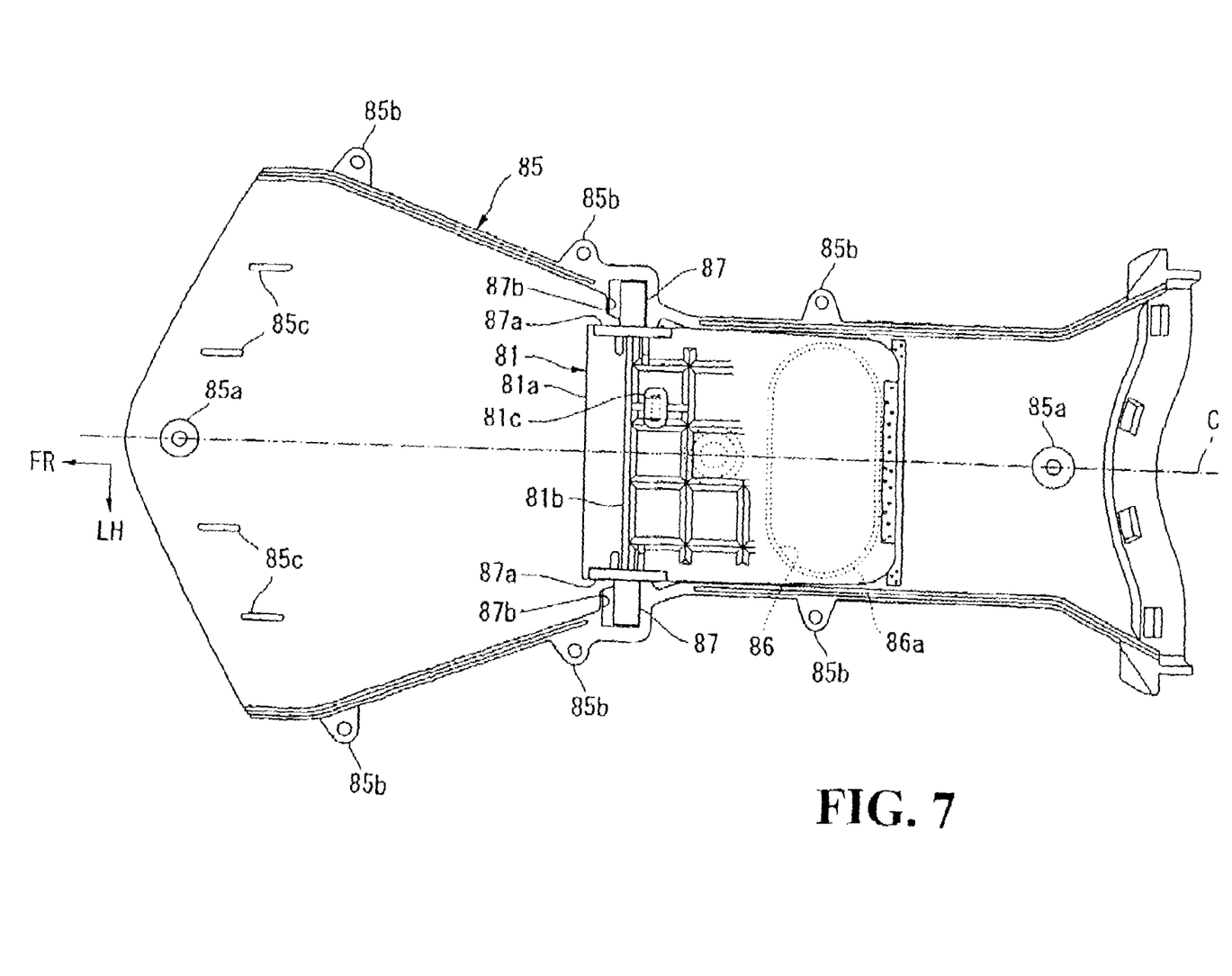
FIG. 7 is a view on arrow D of FIG. 5, showing a duct lower of the intake duct.

Referring also to FIG. 7, the duct lower 85 includes a plurality of boss portions 85a and flange portions 85b. The duct lower 85 and the duct upper 84 are integrally joined together when screws penetrating through the duct upper 84 are tightened at these boss portions 85a and the flange portions 85b. A fin 85c is disposed on an inside of the front end intake port 83.

The in-cowl duct 82 includes a lower portion intake port (sub-intake port) 86 that opens at a middle portion in the longitudinal direction of the straight portion 82b in the lower wall portion thereof.

The lower portion intake port 86 is located forward of a lower portion of the head pipe 6. The lower portion intake port 86 opens obliquely downwardly toward the rear in a space enclosed by the front cowl 46 on both sides thereof. Specifically, the lower portion intake port 86 has an axis X (a line orthogonal to the lower wall surface of the in-cowl duct 82) that is inclined in side view such that the lower a point in the axis X, the more rearward the point is located.

The lower portion intake port 86 is an opening adapted to be smaller than the front end intake port 83. The lower portion intake port 86 is an ellipse having an axis X thereof running in the crosswise direction. The lower portion intake port 86 includes a flange portion 86a disposed on a periphery thereof in a standing condition so as to extend downwardly along the axis X. The arrangement, in which the lower portion intake port 86 opens downwardly, allows an outside air in the front cowl 46 in an area upward of the front wheel 2 to be guided into the in-cowl duct 82. It is to be noted herein that the intake path from the lower portion intake port 86 (an arrow SR in FIG. 5; hereinafter referred to as "sub-intake path") has an intake pipe length arranged to be shorter than that of the intake path from the front end intake port 83 (an arrow MR in FIG. 5; hereinafter referred to as "main intake path").

The intake valve 81 is disposed inside the in-cowl duct 82. The intake valve 81 is capable of selecting the main intake path MR or the sub-intake path SR in order to optimize an effect from the boost pressure using the running wind.

The intake valve 81 is shaped like a rectangular plate so as to be capable of shutting off a flow path in the in-cowl duct 82. The intake valve 81 has four edges running along corresponding ones of the wall portions of the in-cowl duct 82. The intake valve 81 is disposed so as to run in parallel with the crosswise direction.

The intake valve 81 thus structured is shaft supported via a swing shaft 87 running in the crosswise direction at a position near the lower wall portion forward of the lower portion intake port 86. The intake valve 81 is thereby swingable between a flow path fully open position indicated by a solid line in FIG. 5 and a flow path fully closed position indicated by a dot-dash line in FIG. 5.

More specifically, the intake valve 81 can be swung between the flow path fully open position, at which the intake valve 81 extends in parallel with the lower wall portion from a point near the swing shaft 87 rearwardly to directly plug up the lower portion intake port 86 and, at the same time, fully opens the flow path in the intake duct 80, and the flow path fully closed position, at which the intake valve 81 rises obliquely so as to be inclined upwardly toward the rear from the point near the swing shaft 87 to open the lower portion intake port 86 and, at the same time, fully closes the flow path in the intake duct 80.

The swing shaft 87 of the intake valve 81 is disposed at a position offset toward an upper surface side in the flow path fully open position (a front surface side in the flow path fully closed position) relative to a plate-like valve main body 81a. More specifically, small protruding portions 87a of a triangular shape in side view rise up from both side edges at the lower end portion of the intake valve 81 in the flow path fully closed position (the front end portion in the flow path fully closed position). The swing shaft 87 is provided in a condition protruding toward the outside in the crosswise direction from a leading end portion of each of the two small protruding portions 87a. The two swing shafts 87 are mutually coaxial.

A shaft support portion 87b corresponding to each of the swing shafts 87 is disposed near a faying portion between the duct upper 84 and the duct lower 85 in either side wall portion of the intake duct 80. The swing shaft 87 is supported on the shaft support portion 87b so as to be clamped between the duct upper 84 and the duct lower 85. The valve main body 81a of the intake valve 81 includes grid-like reinforcement ribs 81b formed on both faces thereof.

The lower wall portion of the intake duct 80 includes a downwardly changing portion 88 formed thereon. The downwardly changing portion 88 includes an inclined portion and a rise-up portion. The inclined portion extends downwardly toward the rear relative to the extending direction of the intake duct 80 from a point near the front end intake port 83. The rise-up portion rises upwardly at a rear edge of the inclined portion. The downwardly changing portion 88 thus forms a step shape at a position at a rear end portion of the front side tapered portion 82a and immediately under the swing shaft 87 of the intake valve 81. The downwardly changing portion 88 performs two functions. For one, the downwardly changing portion 88 forms a relief for the intake valve 81 when the intake valve 81 makes a swing motion. For the other, the downwardly changing portion 88 provides a sump, in which rainwater and the like flowing down a surface of the valve main body 81a that is inclined upwardly toward the rear are accumulated during a period of time that begins when the intake valve 81 leaves the flow path fully closed position and ends when the intake valve 81 reaches the flow path fully open position.

The intake valve 81 takes the following position in the flow path fully closed position. Specifically, an upper edge portion of the valve main body 81a is pressed tightly up against a recessed stopper portion 89 formed on the upper wall portion of the intake duct 80 via a sealing member. At the same time, a lower edge portion of the valve main body 81a is pressed tightly up against a rear edge portion of the downwardly changing portion 88 on the lower wall portion of the intake duct 80 via a sealing member. The intake valve 81 takes the following position in the flow path fully open position. Specifically, the upper edge portion of the valve main body 81a is pressed tightly up against a point immediately rearward of the lower portion intake port 86 in the lower wall portion of the intake duct 80 via a sealing member.

Drive of the intake valve 81 is operatively connected to a diaphragm 91 disposed upward of the upper wall portion of the intake duct 80. The diaphragm 91 is disposed inside a suction chamber 92 mounted on the right at a rear end portion of the front side tapered portion 82a upward of the upper wall portion. The diaphragm 91 thereby forms a suction chamber with the suction chamber 92. The diaphragm 91 is urged downwardly (toward the intake duct 80) by a spring 93 disposed in the suction chamber 92. Reference numeral 92a in FIG. 6 represents a mounting hole of the suction chamber 92 to the in-cowl duct 82.

A suction piston 94 is joined to the diaphragm 91. The suction piston 94 penetrates through the upper wall portion of the intake duct 80 to protrude into the flow path. An intake negative pressure of the engine 15 acts on an inside of the suction chamber 92. When the intake negative pressure remains small during high speed rotation of the engine (during high speed running of the vehicle), the diaphragm 91 and the suction piston 94 are urged toward the side of the intake duct 80. When the intake negative pressure is large, such as during low speed rotation of the engine (during low speed running of the vehicle), the diaphragm 91 and the suction piston 94 overcome an urging force of the spring 93, being pulled up to be away from the intake duct 80.

A connection rod 95 is extended from the suction piston 94 in an axial direction thereof to reach a point near the lower wall portion of the intake duct 80. A leading end portion of the connection rod 95 is connected to a position slightly rearward of the swing shaft 87 of the intake valve 81. More specifically, a locking portion 81c is disposed on the right of the valve main body 81a in the intake valve 81 at a portion slightly rearward of the swing shaft 87. The locking portion 81c protrudes toward the side of the upper surface at the flow path fully open position. The leading end portion of the connection rod 95 is swingably engaged with the locking portion 81c.

This arrangement accomplishes the following operations. Specifically, during the low speed operation of the engine 15, the suction piston 94 ascends to pull the intake valve 81 up to the flow path fully closed position. The main intake path MR from the front end intake port 83 is thereby closed, while the sub-intake path SR from the lower portion intake port 86 is opened. During high speed operation of the engine 15, on the other hand, the suction piston 94 descends to push the intake valve 81 down to the flow path fully open position. The main intake path MR is thereby opened, while the sub-intake path SR is closed.

Specifically, during the low speed operation of the engine 15, an amount of intake air is kept small so as to prevent an air-fuel mixture from becoming fuel-lean during acceleration. The engine 15 is thereby supplied with the air-fuel mixture of an appropriate air/fuel ratio to achieve good acceleration performance. During the high speed operation of the engine 15, on the other hand, while an intake resistance is reduced, the boost pressure using the running wind is made to act favorably to increase volumetric efficiency of the engine 15, thereby contributing to improved high speed output performance.

As described in the foregoing, the intake duct structure according to the embodiment of the present invention described above includes the intake duct 80 extending forwardly from the air cleaner box 19 to penetrate through the area near the head pipe 6 of the vehicle body frame 5 and opening at the front end portion of the front cowl 46, the front end intake port 83 opening toward the front of the vehicle at the front end portion of the front cowl 46, and the intake valve 81 selecting either the main intake path MR from the front end intake port 83 or the sub-intake path SR from the lower portion intake port 86, the intake valve 81 closing the main intake path MR and opening the sub-intake path SR during a low speed operation of the engine, and the intake valve 81 opening the main intake path MR and closing the sub-intake path SR during a high speed operation of the engine. The intake duct structure is characterized in that the lower portion intake port 86 opens forward of the head pipe 6 inside the front cowl 46 and obliquely downwardly toward the rear.

According to these arrangements, the outside air is drawn in through the sub-intake path SR from the lower portion intake port 86 that opens, inside the front cowl 46, in a direction different from the front end intake port 83 during the low speed operation of the engine. Entry of rainwater and the like into the intake path can therefore be suppressed during the low speed running (or, ordinary running) having a low boost action by running wind pressure.

During the high speed operation of the engine, on the other hand, the outside air (running wind) is drawn in through the main intake path MR from the front end intake port 83 that opens toward the front of the vehicle at the front end portion of the front cowl 46. A boost effect by the running wind pressure can therefore be effectively achieved to improve engine output.

Moreover, use of the single intake valve 81 for selecting the intake path in the intake duct 80 helps simplify the intake path selecting mechanism. Further, the intake valve 81 makes a swing motion while maintaining a rearwardly upwardly inclined posture. This allows the rainwater and the like deposited on the valve main body 81a to flow down forward of the valve main body 81a. In addition, the downwardly changing portion 88 is formed immediately below the valve main body 81a in the lower wall portion of the intake duct 80. The downwardly changing portion 88 thus receives the rainwater and the like flowed down from the valve main body 81a, thus suppressing entry of the rainwater and the like into an area rearward of the intake valve 81.

In the aforementioned intake duct structure, drive of the intake valve 81 is accomplished by the diaphragm 91 operated using the intake negative pressure of the engine 15. The drive mechanism for the intake valve 81 can be made simpler as compared with one using a motor-driven actuator, contributing to a reduced weight and cost.

Further, in the aforementioned intake duct structure, the lower portion intake port 86 opens in the space covered by the front cowl 46 on both sides thereof and in the lower surface of the main intake path MR such that the axis X is inclined so as to be oriented rearwardly. Entry of rainwater and the like into the intake path during low speed running can be even further suppressed.

Moreover, in the aforementioned intake duct structure, the intake valve 81 directly closes the lower portion intake port 86 disposed in the wall surface of the main intake path MR. During the high speed running, or in a condition in which the lower portion intake port 86 is closed, therefore, the intake valve 81 runs in parallel with the wall surface, not protruding in the main intake path MR. This minimizes intake resistance and enhances volumetric efficiency of the engine, thereby improving high speed output performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake duct structure, comprising:
an intake duct extending forwardly from an air cleaner box to penetrate through an area near a head pipe of a vehicle body frame and opening at a front end portion of a front cowl;
a main intake port opening toward a front of a vehicle at the front end portion of the front cowl; and
a valve selecting either a main intake path from the main intake port or a sub-intake path from a sub-intake port, the valve closing the main intake path and opening the sub-intake path during a low speed operation of an engine, and the valve opening the main intake path and closing the sub-intake path during a high speed operation of the engine,
wherein the sub-intake port opens forward of the head pipe inside the front cowl and in a direction different from the main intake port.

2. The intake duct structure according to claim 1, wherein driving of the valve is accomplished by a diaphragm operated using an engine intake negative pressure.

3. The intake duct structure according to claim 2, wherein the sub-intake port opens in a space covered by the front cowl on both sides and in a lower surface of the main intake path such that an axis is inclined so as to be oriented rearwardly.

4. The intake duct structure according to claim 2, further comprising a suction piston connected to the diaphragm, and during the low speed operation of the engine, the suction piston ascends to pull the intake valve up to the flow path fully closed position, whereas during high speed operation of the engine, the suction piston descends to push the intake valve down to the flow path fully open position.

5. The intake duct structure according to claim 1, wherein the sub-intake port opens in a space covered by the front cowl on both sides and in a lower surface of the main intake path such that an axis is inclined so as to be oriented rearwardly.

6. The intake duct structure according to claim 1, wherein the valve directly closes the sub-intake port disposed in a wall surface of the main intake path.

7. The intake duct structure according to claim 1, wherein the intake duct includes an in-cowl duct, an in-frame duct, and a box-side duct, thus forming the main intake path that penetrates through a front end portion of the vehicle body frame from a front end portion of the front cowl to the air cleaner box.

8. The intake duct structure according to claim 1, wherein a portion of the intake duct forward of the head pipe slopes downward toward to main intake port, and a portion of the intake duct rearward of the head pipe slopes downward toward the fair cleaner box.

9. The intake duct structure according to claim 1, wherein the intake duct branches into both sides of the head pipe.

10. The intake duct structure according to claim 1, further comprising a duct cover formed integrally with an outer side at a front end of the vehicle body frame, the duct cover including an intake port immediately forward of head pipe.

11. An intake duct structure, comprising:
  an intake duct extending forwardly from an air cleaner box to penetrate through an area near a head pipe of a vehicle body frame and opening at a front end portion of a front cowl;
  a main intake port opening toward a front of a vehicle at the front end portion of the front cowl; and
  a valve selecting either a main intake path from the main intake port or a sub-intake path from a sub-intake port, the valve closing the main intake path and opening the sub-intake path during a low speed operation of an engine, and the valve opening the main intake path and closing the sub-intake path during a high speed operation of the engine,
  wherein the sub-intake port opens forward of the head pipe inside the front cowl and in a direction substantially perpendicular to the main intake port.

12. The intake duct structure according to claim 11, wherein driving of the valve is accomplished by a diaphragm operated using an engine intake negative pressure.

13. The intake duct structure according to claim 12, wherein the sub-intake port opens in a space covered by the front cowl on both sides and in a lower surface of the main intake path such that an axis is inclined so as to be oriented rearwardly.

14. The intake duct structure according to claim 12, further comprising a suction piston connected to the diaphragm, and during the low speed operation of the engine, the suction piston ascends to pull the intake valve up to the flow path fully closed position, whereas during high speed operation of the engine, the suction piston descends to push the intake valve down to the flow path fully open position.

15. The intake duct structure according to claim 11, wherein the sub-intake port opens in a space covered by the front cowl on both sides and in a lower surface of the main intake path such that an axis is inclined so as to be oriented rearwardly.

16. The intake duct structure according to claim 11, wherein the valve directly closes the sub-intake port disposed in a wall surface of the main intake path.

17. The intake duct structure according to claim 11, wherein the intake duct includes an in-cowl duct, an in-frame duct, and a box-side duct, thus forming the main intake path that penetrates through a front end portion of the vehicle body frame from a front end portion of the front cowl to the air cleaner box.

18. The intake duct structure according to claim 11, wherein a portion of the intake duct forward of the head pipe slopes downward toward to main intake port, and
  a portion of the intake duct rearward of the head pipe slopes downward toward the air cleaner box.

19. The intake duct structure according to claim 11, wherein the intake duct branches into both sides of the head pipe.

20. The intake duct structure according to claim 11, further comprising a duct cover formed integrally with an outer side at a front end of the vehicle body frame, the duct cover including an intake port immediately forward of head pipe.

* * * * *